US012724425B2

(12) United States Patent
Lee et al.

(10) Patent No.: US 12,724,425 B2
(45) Date of Patent: Sep. 1, 2026

(54) DETECTION METHOD, DETECTION PROGRAM, AND WORK VEHICLE

(71) Applicant: Yanmar Holdings Co., Ltd., Osaka (JP)

(72) Inventors: Seungkyu Lee, Okayama (JP); Yasunori Omori, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 60 days.

(21) Appl. No.: 18/656,510

(22) Filed: May 6, 2024

(65) Prior Publication Data

US 2024/0393803 A1 Nov. 28, 2024

(30) Foreign Application Priority Data

May 24, 2023 (JP) ................................ 2023-085270

(51) Int. Cl.
*G05D 1/617* (2024.01)
*G05D 1/648* (2024.01)
*G05D 105/15* (2024.01)

(52) U.S. Cl.
CPC .......... *G05D 1/617* (2024.01); *G05D 1/6484* (2024.01); *G05D 2105/15* (2024.01)

(58) Field of Classification Search
CPC ........ G05D 1/617; G05D 1/619; G05D 1/622; G05D 1/628; G05D 1/633; G05D 1/637; G05D 1/642; G05D 2105/15
See application file for complete search history.

(56) References Cited

U.S. PATENT DOCUMENTS 12,324,370 B2 * 6/2025 Nakabayashi ......... A01B 69/00
2024/0023473 A1 1/2024 Iwase
2024/0345243 A1 * 10/2024 Orlovsky ................ G01S 7/412
2024/0345253 A1 * 10/2024 Matsuzaki ........... A01B 69/008

FOREIGN PATENT DOCUMENTS

JP 2022088097 A 6/2022

* cited by examiner

*Primary Examiner* — Aaron L Troost
(74) *Attorney, Agent, or Firm* — Chris Mizumoto

(57) ABSTRACT

A combine harvester includes a detection unit capable of detecting a surrounding detection target, and automatically travels along a target route. A setting processing unit sets the detection function for the detection target to be enabled or disabled based on the target route. The detection processing unit causes the combine harvester to execute predetermined processing on the detection target in accordance with the setting state of the detection function.

8 Claims, 13 Drawing Sheets

| TIME INFORMATION | DETECTION UNIT | | | |
|---|---|---|---|---|
| | FRONT | REAR | LEFT SIDE | RIGHT SIDE |
| ⋮ | ⋮ | ⋮ | ⋮ | ⋮ |
| t1 | 0 | 0 | 0 | 0 |
| t2 | 1 | 0 | 0 | 0 |
| t3 | 1 | 0 | 1 | 0 |
| t4 | 1 | 0 | 1 | 0 |
| t5 | 0 | 0 | 1 | 0 |
| t6 | 0 | 0 | 0 | 0 |
| ⋮ | ⋮ | ⋮ | ⋮ | ⋮ |
| t7 | 0 | 0 | 0 | 0 |
| t8 | 1 | 0 | 0 | 0 |
| t9 | 0 | 0 | 0 | 0 |
| ⋮ | ⋮ | ⋮ | ⋮ | ⋮ |
| t10 | 1 | 0 | 0 | 0 |
| t11 | 1 | 0 | 1 | 1 |
| t12 | 1 | 0 | 1 | 1 |
| ⋮ | ⋮ | ⋮ | ⋮ | ⋮ |

DETECTION METHOD, DETECTION PROGRAM, AND WORK VEHICLE

CROSS-REFERENCE

This application claims foreign priority of JP2023-085270 filed May 24, 2023, the disclosure of which is hereby incorporated by reference in its entirety.

TECHNICAL FIELD

The present invention relates to a detection method, a detection program, and a work vehicle for detecting a detection target around an automatically traveling work vehicle.

BACKGROUND ART

In the related art, a known work vehicle (for example, a combine harvester) automatically travels in a field in accordance with a target route set in advance (for example, see Patent Document 1). For example, a combine harvester includes a reaping unit that reaps grain culms and a detection unit that detects an obstacle, and performs a reaping work by the reaping unit while determining the presence or absence of an obstacle ahead in the traveling direction.

PRIOR ART DOCUMENT

Patent Document

Patent Document 1: Japanese Unexamined Patent Application Publication No. 2021-185852

SUMMARY OF INVENTION

Technical Problem

When traveling in the work area, a conventional work vehicle performs, for example, a process of excluding a predetermined range from the detection target so that a work object (for example, grain culms) is not recognized as the obstacle. However, applying this process causes an inconvenience in that the detection target (persons, objects, or the like) within the predetermined range cannot appropriately be detected as the obstacle when the work vehicle travels in a non-work area or a work-completed area.

An object of the present invention is to provide a detection method, a detection program, and a work vehicle capable of appropriately detecting a detection target as an obstacle.

Solution to Problem

A detection method according to the present invention detects a detection target around a work vehicle by a detection unit provided in the work vehicle that automatically travels along a target route, and sets a detection function for the detection target to be enabled or disabled based on the target route.

A detection program according to the present invention is a detection program for detecting a detection target around a work vehicle by a detection unit provided in the work vehicle that automatically travels along a target route, the detection program causing one or more processors to execute setting of a detection function for the detection target to be enabled or disabled based on the target route.

A work vehicle according to the present invention includes a detection unit capable of detecting a surrounding detection target, travels automatically along a target route, and includes a setting processing unit that sets a detection function for the detection target to be enabled or disabled based on the target route, and a detection processing unit that causes the work vehicle to execute predetermined processing for the detection target in accordance with a setting state of the detection function.

Advantageous Effects of Invention

According to the present invention, a detection method, a detection program, and a work vehicle capable of appropriately detecting a detection target as an obstacle.

BRIEF DESCRIPTION OF DRAWINGS

FIG. 7 illustrates an example of detection information stored in a storage unit of the combine harvester according to the embodiment of the present invention.

DESCRIPTION OF EMBODIMENTS

An embodiment described below is an example embodying the present invention, and does not intend to limit the technical scope of the present invention.

Figure 1:
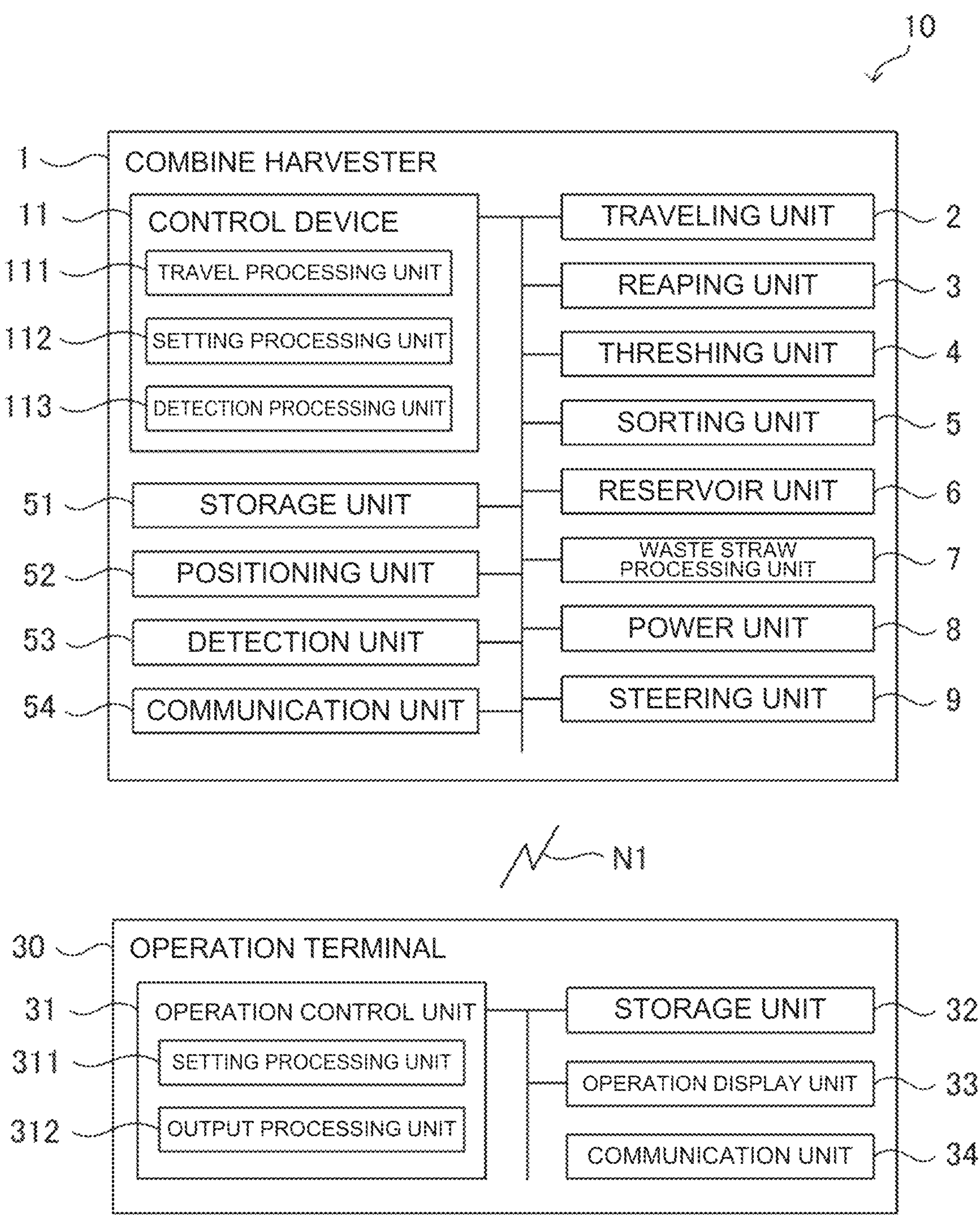
FIG. 1 is a functional block diagram illustrating a configuration of a traveling system according to an embodiment of the present invention.

A combine harvester 1 is described as an example of the work vehicle of the present invention. As illustrated in FIG. 1, a traveling system 10 according to the embodiment of the present invention includes a combine harvester 1 and an operation terminal 30. The combine harvester 1 and the operation terminal 30 can communicate with each other via a communication network N1. For example, the combine harvester 1 and the operation terminal 30 can communicate via a mobile phone network, a packet network, or a wireless local area network (LAN).

The combine harvester 1 is a work vehicle that performs agricultural work (an example of a predetermined work of the present invention) such as reaping in a field. The combine harvester 1 works while traveling, and transmits global navigation satellite system (GNSS) information of a GNSS antenna mounted on the combine harvester 1, that is, the own position of the combine harvester 1 as measurement point data to the operation terminal 30.

In addition, the combine harvester 1 can automatically travel along a preset target route. The combine harvester 1 may be configured to automatically travel in a partial area of the field (for example, a straight route) and to manually travel in other areas of the field (for example, a turning route). The combine harvester 1 receives various kinds of setting information from the operation terminal 30, and automatically travels in accordance with the setting information.

The operation terminal 30 is a portable terminal capable of remotely operating the combine harvester 1, and is composed of, for example, a tablet terminal, a notebook personal computer, a smart phone, or the like. An operation device similar to the operation terminal 30 may be provided in the combine harvester 1.

A worker (operator) can perform the setting operation for various setting items on the operation terminal 30. The operation terminal 30 also displays the information such as a work state, a traveling state, or the like of the combine harvester 1 during autonomous traveling. The operator can recognize the work state and traveling state at the operation terminal 30. The operation terminal 30 may be omitted in the present invention.

Figure 4:
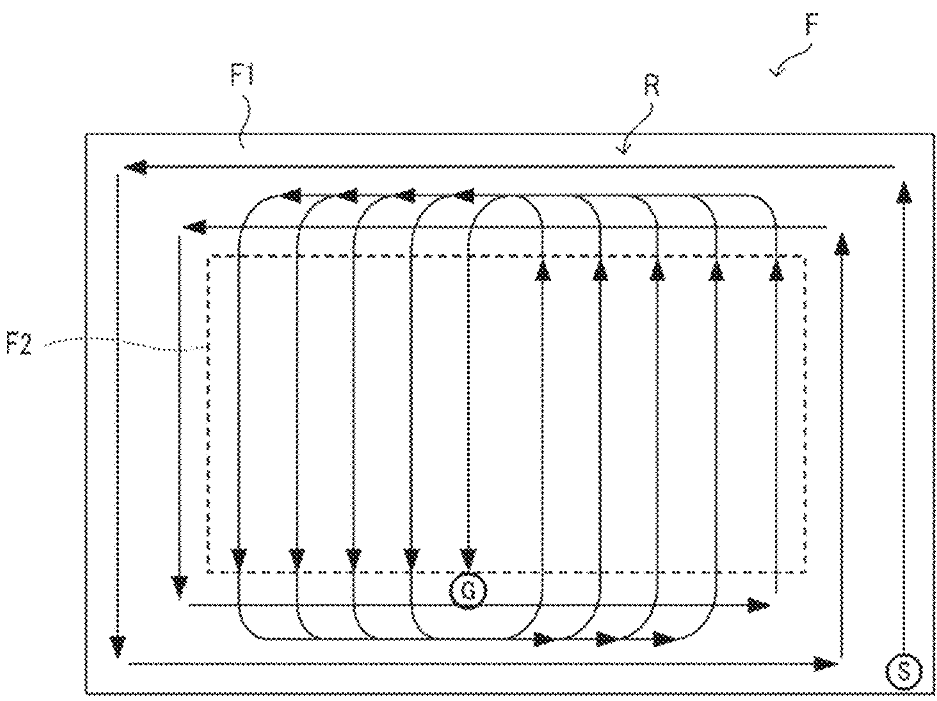
FIG. 4 illustrates an example of a target route set in a field according to the embodiment of the present invention.

FIG. 4 illustrates an example of a target route R set for a field F. For example, the combine harvester 1 performs a reaping work ("round reaping", "reciprocating reaping") in the field F from a start position S to an end position G along the target route R while traveling from the outer peripheral side to the inner peripheral side. Specifically, in an outer peripheral area F1 on the outer peripheral side of the field F, the combine harvester 1 performs the reaping work while traveling along the edge (outer periphery) of the field. In an inner peripheral area F2 on the inner peripheral side of the field F, the combine harvester 1 performs the reaping work while traveling straight on each work route in the vertical direction of FIG. 4, while moving between the work routes by turning and straight traveling without doing the reaping work in the left-right direction.

An example of a work procedure of the combine harvester 1 is described with reference to FIG. 5. The combine harvester 1 starts the automatic travel from the start position S and travels along the outer periphery of the field F while reaping grain culms. The combine harvester 1 threshes the reaped grain culms and externally discharges waste straws such as straw debris from the rear of the machine body to the outside. Accordingly, the waste straws B1 are accumulated in the traveling track of the combine harvester 1, and a waste straw row is formed on the route where the combine harvester 1 has finished the reaping work. The combine harvester 1 is set to discharge the waste straws of the reaped grain culms at the positions of the grain culms to be reaped, and is configured to grasp positions, a width (a lateral width in the left-right direction of the waste straw row), a length, and the like of the waste straws B1. For example, the waste straws B1 are discharged in a width narrower than the lateral width of the machine body with reference to the center in the left-right direction of the combine harvester 1.

For example, the combine harvester 1 goes around the outer peripheral area F1 twice. In this case, a waste straw row for two rounds is formed. The number of turns of the outer peripheral area F1 is not limited to two, and may be one or three or more.

After finishing the reaping work of the outer peripheral area F1, the combine harvester 1 enters the inner peripheral area F2 and starts the reaping work of the inner peripheral area F2. In the inner peripheral area F2, the combine harvester 1 performs the reaping work in the vertical direction of FIG. 5 while traveling straight on each work route, and moves between the work routes by turning and traveling straight in the outer peripheral area F1 (a work-completed area, a reaped area) without performing the reaping work in the left-right direction. The combine harvester 1 performs the reaping work in the inner peripheral area F2, and finishes the automatic traveling and the reaping work when reaching the end position G.

The combine harvester 1 performs the reaping operation while automatically traveling along the target route R in the field F as described above. The combine harvester 1 may be configured to automatically travel without the operator on board, may be configured to automatically travel with the operator on board while receiving an operation from the operator, or may be configured to travel in response to manual steering by the operator (manual travel). The combine harvester 1 may also be switchable between the automatic travel mode and the manual travel mode in accordance with a setting operation by the operator.

Operation Terminal 30

As illustrated in FIG. 1, the operation terminal 30 is an information processing device including an operation control unit 31, a storage unit 32, an operation display unit 33, a communication unit 34, and the like. The operation terminal 30 is composed of, for example, a tablet terminal.

The communication unit 34 is a communication interface that connects the operation terminal 30 to the communication network N1 by wire or wirelessly so as to execute data communication in accordance with a predetermined communication protocol with external devices such as one or more combine harvesters 1 via the communication network N1.

The operation display unit 33 is a user interface including a display unit, such as a liquid crystal display or an organic electroluminescence (EL) display, that displays various types of information, and an operation unit, such as a touch panel, a mouse, or a keyboard, that accepts operations. On the operation screen displayed on the display unit, the operator can operate the operation unit to perform a registration operation of various types of setting information. The operator can operate the operation unit to provide an automatic travel instruction for the combine harvester 1. Furthermore, the operator can grasp, at a place distant from the combine harvester 1, the traveling state of the combine harvester 1 that automatically travels in the field F, according to the traveling trajectory displayed on the operation terminal 30.

The storage unit 32 is a non-volatile storage unit such as a hard disk drive (HDD), a solid state drive (SSD), or a flash memory that stores various types of information. The storage unit 32 stores a control program for causing the operation control unit 31 to execute predetermined control processing. For example, the control program is non-temporarily recorded in a computer-readable recording medium, such as a flash read-only memory (ROM), an electrically erasable programmable read-only memory (EEPROM), a compact disc (CD), or a digital versatile disc (DVD), which is read by a predetermined reading device (not illustrated) provided in the operation terminal 30 and stored in the storage unit 32. The control program may be downloaded from a server (not illustrated) to the operation terminal 30 via the communication network N1 and stored in the storage unit 32. The storage unit 32 may also store the work information transmitted from the combine harvester 1.

In addition, the storage unit 32 includes a dedicated application installed for enabling the automatic travel of the combine harvester 1. The operation control unit 31 activates the dedicated application to execute setting processing of various types setting information about the combine harvester 1, issue an automatic travel instruction to the combine harvester 1, and the like.

The operation control unit 31 includes control devices such as a central processing unit (CPU), a read-only memory (ROM), and a random access memory (RAM). The CPU is a processor that executes various types of arithmetic processing. The ROM is a non-volatile storage unit that stores in advance control programs such as a basic input/output system (BIOS) and an operating system (OS) for causing the CPU to execute various types of arithmetic processing. The RAM is a volatile or non-volatile storage unit that stores various pieces of information and is used as a temporary storage memory for the various processing executed by the CPU. The operation control unit 31 controls the operation terminal 30 with the CPU executing various kinds of control programs stored in advance in the ROM or the storage unit 32.

As illustrated in FIG. 1, the operation control unit 31 includes various types of processing units such as a setting processing unit 311, an output processing unit 312, and the like. The operation control unit 31 functions as the various processing units by causing the CPU to execute various processing according to the control program. Some or all of the processing units may be composed of an electronic circuit. The control program may be a program that causes a plurality of processors to function as the processing units.

The setting processing unit 311 sets various kinds of setting information for the combine harvester 1 to perform automatic traveling. Specifically, the setting processing unit 311 sets field information about the field. The field information includes, for example, the shape, size, and position information (coordinates and the like) of the outermost periphery of the field, measurement point data constituting the outermost periphery of the field, and the shape, size, and position information (coordinates and the like) of a work area in the field for performing the work in the field. The field information includes an address of the field, the registered name and date of the field information, the registered name and date of the work area in the field, and the like. The setting processing unit 311 accepts the registration operation of the field information by the operator and sets the field information.

The setting processing unit 311 creates the target route R including the work route and the turning route. For example, the operator selects a route pattern, a turning type, and the like on a setting screen (not illustrated). The route pattern includes the "reciprocating reaping" for reaping a plurality of routes in a reciprocating manner, and the "round reaping" for repeating the reaping of the route along the inner periphery of the work area in the field while shifting the round route toward the center side. On the setting screen, the operator can also correct the turning radius when turning on the work route during the reciprocating reaping and the round reaping.

In addition, the setting processing unit 311 creates a work route based on the information such as the field information, the route pattern, the turning type, and the turning radius. The setting processing unit 311 registers the created work route (target route R) by associating it with the field F.

The setting processing unit 311 also sets work information regarding work to be performed by the combine harvester 1. The work information includes information on a reaping work, information on an intermediate work performed by the combine harvester 1 at a predetermined position during the reaping work, and the like. For example, when the accumulated amount of a reservoir tank 27 (see FIG. 2) reaches a predetermined amount (upper limit value) during the reaping work, the combine harvester 1 moves to a discharge position in the field F and discharges the grain stored in the reservoir tank 27 to a transport vehicle (see FIGS. 14 and 15). In addition, for example, when the fuel reaches a predetermined amount (lower limit value) during the reaping work, the combine harvester 1 moves to a refuel position in the field F for refueling. The setting processing unit 311 sets the discharge position and the resupply position at any positions in the field F in accordance with the setting operation performed by the operator. The work information includes information such as the upper limit value of the accumulated amount, the discharge position, the lower limit value of the fuel, the refuel position, and the like.

The setting processing unit 311 sets the traveling speed (vehicle speed) of the combine harvester 1. For example, the operator can set the straight traveling vehicle speed, the turning vehicle speed, and the rearward vehicle speed for working and non-working conditions on the setting screen.

In addition to the above-described information, the setting processing unit 311 sets known information such as the type of the combine harvester 1 (the maximum number of rows to be reaped), the vehicle width, the vehicle length, and the like.

The output processing unit 312 outputs various kinds of setting information set by the setting processing unit 311 to the combine harvester 1. Based on operation by the operator, the output processing unit 312 outputs a work start instruction and a work end instruction to the combine harvester 1.

When the operation control unit 31 receives the work start instruction operation from the operator, the output processing unit 312 outputs the work start instruction to the combine harvester 1. Accordingly, the control device 11 of the combine harvester 1 acquires the work start instruction from the operation terminal 30. Upon acquisition of the work start instruction, the control device 11 starts working and traveling of the combine harvester 1. When the operation control unit 31 accepts the operation stop instruction from the operator, the output processing unit 312 outputs the work stop instruction to the combine harvester 1. Accordingly, the control device 11 of the combine harvester 1 acquires the work stop instruction from the operation terminal 30. Upon acquisition of the work stop instruction, the control device 11 stops the work and travel of the combine harvester 1.

The operation terminal 30 may be accessible to a website of an agricultural support service (agricultural support site) provided by a server (not illustrated) via the communication network N1. In this case, the operation control unit 31 executes a browser program, allowing the operation terminal 30 to function as an operating terminal of the server. The server is equipped with the above-described processing units and executes respective processing.

Combine Harvester 1

Figure 2:
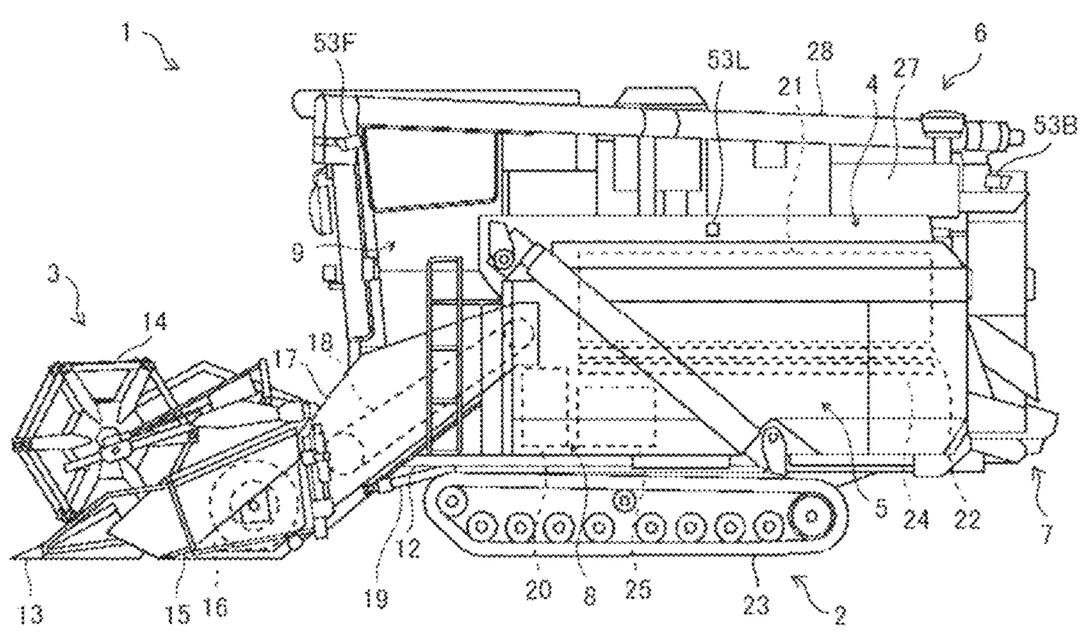
FIG. 2 is an external side view illustrating a configuration of a combine harvester according to the embodiment of the present invention.
Figure 3:
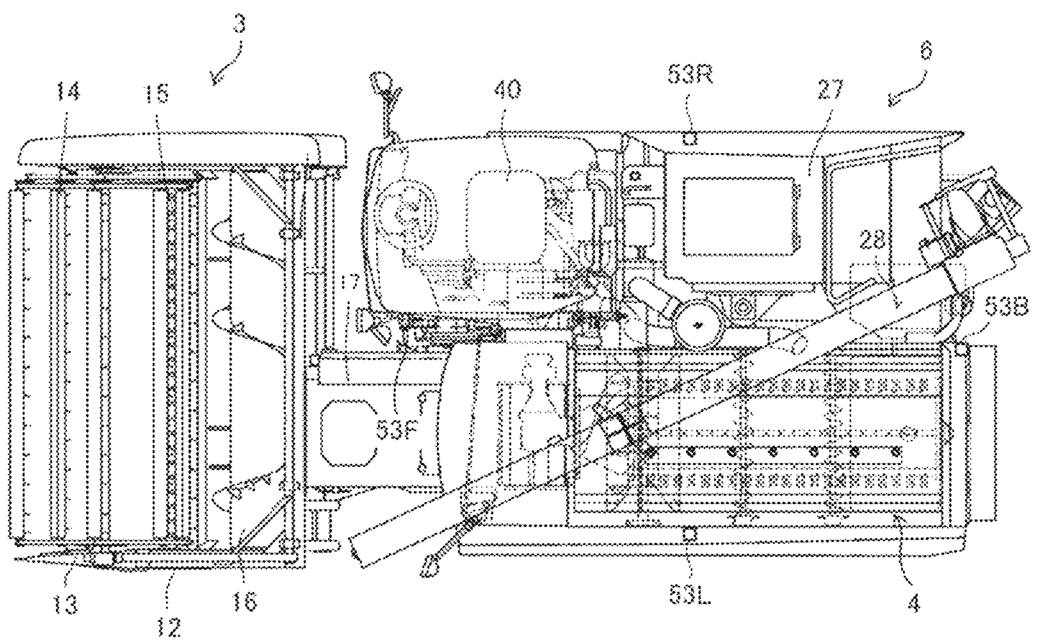
FIG. 3 is an external top view illustrating the configuration of the combine harvester according to the embodiment of the present invention.

FIG. 2 is an external view of the combine harvester 1 when viewed from the side, and FIG. 3 is an external view of the combine harvester 1 when viewed from above. As illustrated in FIGS. 1 to 3, the combine harvester 1 includes a traveling unit 2, a reaping unit 3, a threshing unit 4, a sorting unit 5, a reservoir unit 6, a waste straw processing unit 7, a power unit 8, a steering unit 9, a control device 11, a storage unit 51, a positioning unit 52, a detection unit 53, a communication unit 54, and the like. While traveling by the traveling unit 2, the combine harvester 1 reaps grain culms by the reaping unit 3, threshes the reaped grain culms by the threshing unit 4, sorts grains by the sorting unit 5, and accumulates the grains in the reservoir unit 6. The combine harvester 1 also processes the waste straws after threshing by the waste straw processing unit 7. The combine harvester 1 uses the power supplied from the power unit 8 to drive the traveling unit 2, the reaping unit 3, the threshing unit 4, the sorting unit 5, the reservoir unit 6, and the waste straw processing unit 7.

The traveling unit 2 is provided under a machine body frame 12, and includes a pair of left and right crawler-type traveling device 23 and a transmission (not illustrated). The traveling unit 2 uses the power (for example, the rotational power) transmitted from the engine 20 of the power unit 8 to rotate the crawlers of the crawler-type traveling device 23, thus traveling the combine harvester 1 in the front-rear direction or turn in the left-right direction. The transmission transmits the power (rotational power) of the power unit 8 to the crawler-type traveling device 23 and can also change the speed of the rotational power.

The reaping unit 3 is a work machine that performs work on the field F to be worked and is provided in front of the traveling unit 2, reaping the grain culms over a predetermined reaping width in an area in which non-reaped grain culms are present, which is an unworked area of the field F (hereinafter referred to as an unreaped area). The reaping unit 3 is an example of a work unit of the present invention. The reaping unit 3 includes a divider 13, a raking reel 14, a reaping blade 15, a raking auger 16, a feeder house 17, and a transport conveyor 18. The reaping unit 3 includes a rotation detection unit (not illustrated) that detects a rotation speed (work speed) of a rotation work for performing the reaping work. The rotation detection unit is composed of, for example, a rotation sensor that detects the rotation speed of the raking reel 14, the rotation speed of the raking auger 16, and the rotation speed of the transport conveyor 18.

The divider 13 is provided to protrude forward from the left front end and the right front end of the reaping unit 3, and guides the grain culms in the unreaped area to put them within the reaping width. The raking reel 14 is located behind the divider 13 to be rotatable around a rotation axis extending in the left-right direction. In order to assist reaping of the grain culms guided by the divider 13, the raking reel 14 is rotationally driven to rake the ear tip side of the grain culms while raising the grain culms. The reaping blade 15 is disposed under the raking reel 14 and reaps the grain culms by cutting the culm base side of the grain culms having been raked by the raking reel 14.

The raking auger 16 is disposed behind the raking reel 14 and the reaping blade 15 and is provided rotatably around a rotation axis extending in the left-right direction. The raking auger 16 is rotationally driven to rake the grain culms having been reaped by the reaping blade 15 and transports the grain culms rearward.

The feeder house 17 extends forward from the machine body frame 12 to be located behind the raking auger 16, and is supported by the machine body frame 12 in a manner capable of lifting and lowering. Lifting and lowering the feeder house 17 causes lifting and lowering of the divider 13, the raking reel 14, the reaping blade 15, and the raking auger 16, that is, the reaping unit 3.

The combine harvester 1 includes, in the machine body frame 12, a lifting and lowering device 19 that causes lifting and lowering of the feeder house 17 to lift and lower the reaping unit 3, thus lifting and lowering the reaping unit 3 between a working position (see FIG. 2) and a non-working position (not illustrated). The lifting and lowering device 19 is composed of a hydraulic cylinder or the like that operates upon receipt of power from the engine 20.

The transport conveyor 18 is provided in a rotatable manner in the feeder house 17 and moves along with the lifting and lowering of the feeder house 17. The transport conveyor 18 is rotationally driven to transport the grain culms conveyed into the feeder house 17 by the raking auger 16 further rearward to the threshing unit 4.

The threshing unit 4 is provided behind the feeder house 17 of the reaping unit 3, and threshes the grain culms transported from the feeder house 17. The threshing unit 4 includes a threshing cylinder 21 and a receiving net 22. The threshing cylinder 21 threshes grains from grain culms transported from the feeder house 17, and transports the threshed grain culms, that is, waste straws to the waste straw processing unit 7. The receiving net 22 supports the grain culms transported by the threshing cylinder 21, and sieves the grains to let them fall.

The sorting unit 5 is provided under the threshing unit 4. The sorting unit 5 includes a swing sorting device 24, a blower sorting device 25, a grain transport device (not illustrated), and a straw debris discharging device (not illustrated). The swing sorting device 24 sieves the threshed grains fallen from the threshing unit 4 and sorts them into grains, straw debris, and the like. The blower sorting device 25 further sorts the threshed grains fallen from the threshing unit 4 or the threshed grains sorted by the swing sorting device 24 into grains, straw debris, and the like by blowing air. The grain transport device transports the grains sorted by the swing sorting device 24 and the blower sorting device 25 to the reservoir unit 6. The waste straw discharging device discharges the straw debris and the like other than the grains sorted by the swing sorting device 24 and the blower sorting device 25 to the outside of the machine.

The reservoir unit 6 is provided on the right side of the threshing unit 4. The reservoir unit 6 includes a reservoir tank (grain tank) 27 and a grain discharging device 28. The reservoir tank 27 accumulates the grains transported from the sorting unit 5. The grain discharging device 28 includes a discharging auger or the like to perform a discharging work of the grains to discharge the grains accumulated in the reservoir tank 27 to the transport vehicle at a predetermined discharge position.

The waste straw processing unit 7 is provided behind the threshing unit 4. The waste straw processing unit 7 includes a waste straw transport device (not illustrated) and a waste straw cutting device (not illustrated). The waste straw processing unit 7 uses the waste straw transport device to transport the waste straws transported from the threshing unit 4 to the waste straw cutting device, and, after cutting the waste straws by the waste straw cutting device, discharges the cut waste straws to the rear of the combine harvester 1 (see FIG. 5).

The power unit 8 is provided above the traveling unit 2 and below the reservoir unit 6. The power unit 8 includes the engine 20 which generates rotational power. The power unit 8 transmits the rotational power generated by the engine 20 to the traveling unit 2, the reaping unit 3, the threshing unit 4, the sorting unit 5, the reservoir unit 6, and the waste straw processing unit 7. The combine harvester 1 also includes a fuel tank that stores a fuel to be supplied to the engine 20 of the power unit 8.

The steering unit 9 is provided above the power unit 8. The steering unit 9 includes operation devices to steer the travel of the combine harvester 1 around the driver's seat which is a seat 40 on which the operator sits, such as a steering wheel to provide a turn instruction of the machine body of the combine harvester 1, and main and auxiliary speed levers to provide a speed change instruction of the forward and rearward travel of the combine harvester 1. Manual traveling of the combine harvester 1 is executed by the traveling unit 2 when it accepts operations of the steering wheel and the main and auxiliary speed change levers of the steering unit 9. The steering unit 9 also includes a mechanism for operating the reaping work by the reaping unit 3, the threshing work by the threshing unit 4, the discharging work by the grain discharging device 28 from the reservoir unit 6, and the like.

The positioning unit 52 acquires the own position of the combine harvester 1 using a satellite positioning system such as a global positioning system (GPS) or the like. For example, the positioning unit 52 receives a positioning signal from a positioning satellite via a positioning antenna, and acquires position information of the positioning unit 52, that is, the own position of the combine harvester 1 (measurement point data), based on the positioning signal. The positioning unit 52 may be composed of a quantum compass instead of the positioning antenna.

The communication unit 54 is a communication interface for connecting the combine harvester 1 to the communication network N1 by wire or wirelessly and performing data transmission with external devices such as the operation terminal 30 via the communication network N1 in accordance with a predetermined communication protocol.

The storage unit S1 is a non-volatile storage unit such as an HDD, an SSD, or a flash memory that stores various kinds of information. The storage unit 51 stores a control program such as a travel program for causing the control device 11 to execute traveling processing (see FIG. 13) which will be described later. For example, the travel program is non-transitorily recorded in a computer-readable recording medium such as a flash ROM, an EEPROM, a CD, or a DVD, read by a predetermined reading device (not illustrated), and stored in the storage unit 51. The travel program may be downloaded from a server (not illustrated) to the combine harvester 1 via the communication network N1 and stored in the storage unit 51. The storage unit 51 also stores various types of setting information acquired from the operation terminal 30.

The detection unit 53 is a sensor that detects a detection target in a predetermined detection range using infrared rays, ultrasonic waves, and the like. For example, the detection unit 53 may be a lidar sensor (distance sensor) capable of three dimensionally measuring a distance to a measurement target (detection target) using lasers, or may be a sonar sensor including a plurality of sonars capable of measuring a distance to a measurement target using ultrasonic waves. Further, the sonar sensor may not have a function of measuring a distance. As illustrated in FIGS. 2 and 3, the detection unit 53 includes a front detection unit 53F provided at the front portion of the machine body of the combine harvester 1, a rear detection unit 53B provided at the rear portion of the machine body, a left side detection unit 53L provided on the left side portion of the machine body, and a right side detection unit 53R provided on the right side portion of the machine body. The work vehicle 1 of the present invention may include one detection unit, or may be configured to include a plurality of detection units. In the combine harvester 1 of the present embodiment, the front detection unit 53F and the rear detection unit 53B are composed of the lidar sensors, and the left side detection unit 53L and the right side detection unit 53R are composed of the sonar sensors. Alternatively, however, all of the front detection unit 53F, the rear detection unit 53B, the left side detection unit 53L, and the right side detection unit 53R may be composed of the lidar sensors or sonar sensors.

Figure 6:
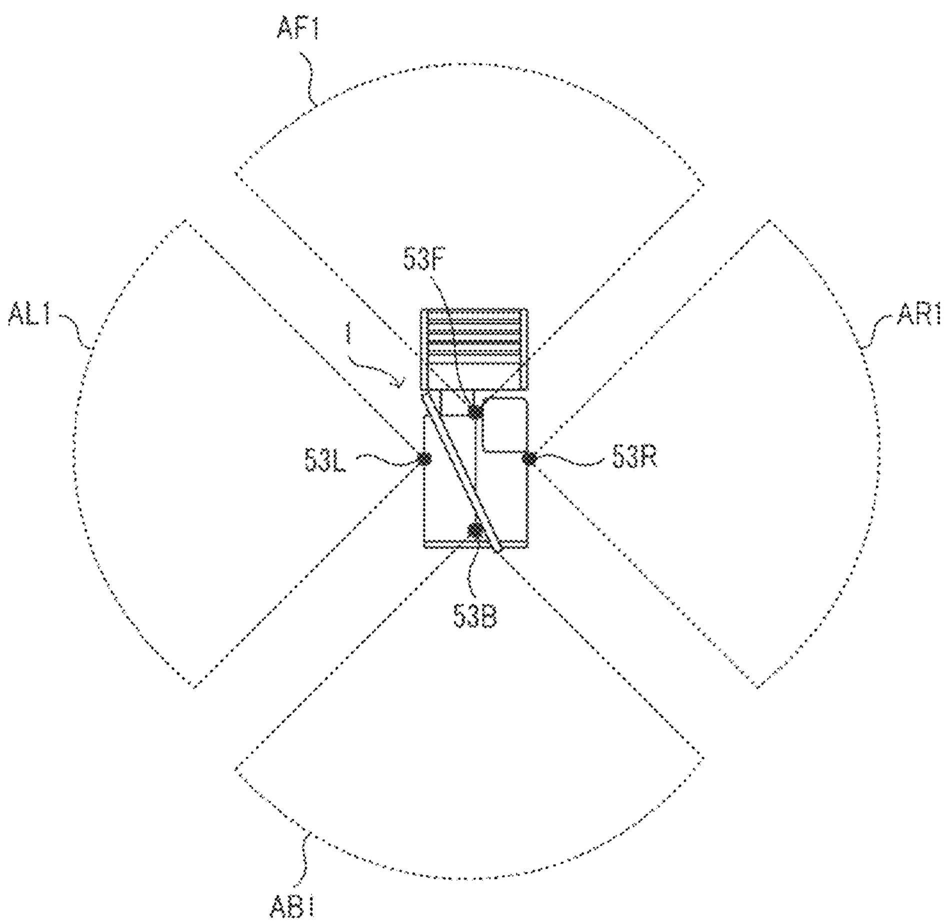
FIG. 6 illustrates an example of a detection range of each detection unit provided in the combine harvester according to the embodiment of the present invention.

In addition, the detection unit 53 is configured to be capable of detecting the detection target (for example, a person, an object, a structure, or the like) in a predetermined detection range set in advance. For example, an area to be monitored (a detection range) for controlling the travel of the combine harvester 1 can be set for the detection unit 53. FIG. 6 schematically illustrates an example of the detection range of each detection unit 53. For example, a detection range AF1 of the front detection unit 53F and a detection range AB1 of the rear detection unit 53B include a stop area closest to the combine harvester 1, a deceleration area farther from the stop area, and a notification area farther from the deceleration area. For example, the stop area is set in a range of about two meters from the combine harvester 1, the deceleration area is set in a range of about six meters from the stop area, and the notification area is set in a range of about two meters from the deceleration area. For example, in a detection range AL1 of the left side detection unit 53L and a detection range AR1 of the right side detection unit 53R, a stop area is set in a range of two meters from the combine harvester 1. The deceleration area and a notification area may be set in the detection range of the left side detection unit 53L and the right side detection unit 53R. The range of each area may be set according to the vehicle speed of the combine harvester 1.

The detection unit 53 transmits the measurement information (detection information) to the control device 11. The control device 11 determines whether the detection target is an obstacle, while identifying the position of the detection target (obstacle) based on the measurement information acquired from the detection unit 53. When it is determined that the detection target detected in the notification area during the automatic traveling of the combine harvester 1 is the obstacle, the control device 11 notifies an alarm externally. When it is determined that the detection target detected in the deceleration area during the automatic traveling of the combine harvester 1 is the obstacle, the control device 11 decelerates the combine harvester 1. When it is determined that the detection target detected in the stop area during the automatic traveling of the combine harvester 1 is the obstacle, the control device 11 stops the combine harvester 1. The control device 11 may output position information indicating the identified position of the obstacle to the operation terminal 30.

Alternatively, the detection unit 53 may be composed of a camera. For example, the detection unit 53 analyzes a captured image obtained by imaging the surroundings of the combine harvester 1 to detect the detection target. The detection unit 53 may determine a person, an object, or a work object (grain culms or the like), and the control device 11 may perform notification processing, deceleration processing, stop processing, or the like according to the determination result. Alternatively, the detection unit 53 may be composed of a lidar sensor and a camera. In this case, the detection unit 53 detects the detection target based on the captured image and the distance measured by the lidar sensor. The detection unit 53 is an example of the detection unit of the present invention.

The control device 11 includes control devices such as a CPU, a ROM, and a RAM. The CPU is a processor that executes various types of arithmetic processing. The ROM is a non-volatile storage unit that stores in advance control programs such as a BIOS and an OS for causing the CPU to execute various types of arithmetic processing. The RAM is a volatile or non-volatile storage unit that stores various pieces of information and is used as a temporary storage memory for the various processing executed by the CPU. The control device 11 controls the combine harvester 1 by causing the CPU to execute various types of control programs stored in advance in the ROM or the storage unit 51.

In a conventional combine harvester, for example, a predetermined range is removed from the detection target so that the combine harvester does not recognize a work object (for example, grain culms) as the obstacle when traveling in the work area. However, once this processing is applied, the detection target (a person, an object, or the like) included in the predetermined range cannot be appropriately detected as the obstacle when the combine harvester travels in the non-work area or the work-completed area. In contrast, the work vehicle 1 according to the present embodiment is configured to appropriately detect the detection target as the obstacle as described below.

Specifically, as illustrated in FIG. 1, the control device 11 includes various processing units such as a travel processing unit 111, a setting processing unit 112, and a detection processing unit 113. The control device 11 functions as the various processing units by causing the CPU to execute various processing according to the travel program. Some or all of the processing units may be composed of an electronic circuit. The travel program may be a program that causes a plurality of processors to function as the processing units.

The travel processing unit 111 executes travel processing for causing the combine harvester 1 to travel. Specifically, the travel processing unit 111 causes the combine harvester 1 to automatically travel along the target route R set for the field F. The travel processing unit 111 causes the combine harvester 1 to travel in accordance with a plurality of work routes on which the combine harvester 1 is made to perform a predetermined work (reaping work) and transfer routes (for example, turning routes) connecting the plurality of the work routes, both routes included in the target route R. The travel processing unit 111 acquires various setting information set for the field F from the operation terminal 30. In the reaping work, the travel processing unit 111 acquires the own position of the combine harvester 1 from the positioning unit 52, and controls the traveling unit 2, the reaping unit 3, and the power unit 8 so as to make the combine harvester 1 perform the automatic travel and the reaping work along the work route based on the own vehicle position and the work route included in the target route R.

Figure 5:
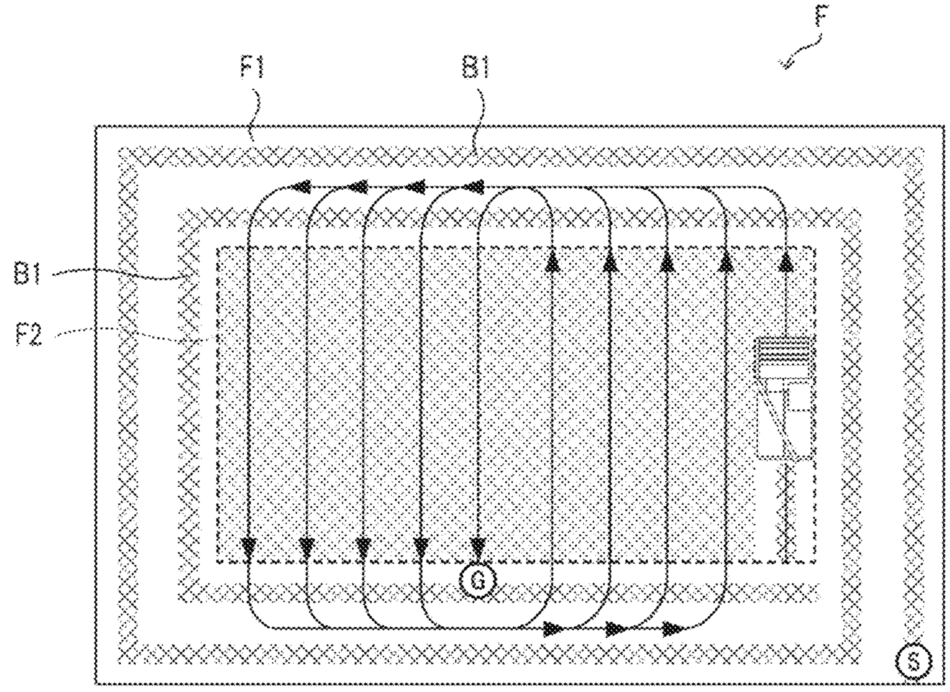
FIG. 5 illustrates an example of a work procedure of the combine harvester according to the embodiment of the present invention.

For example, as illustrated in FIG. 5, the travel processing unit 111 causes the combine harvester 1 to automatically travel from the start position S and perform the reaping operation along the outer periphery in the outer peripheral area F1, and then causes the combine harvester 1 to automatically travel and perform the reaping operation in the inner peripheral area F2 until the end position G.

The setting processing unit 112 sets the detection function for the detection target to be enabled or disabled based on the target route R (travel route). Here, "enabling the detection function" means using a detection result of detection of the detection target by the detection unit 53 (for example, information of an identification signal indicating that the detection target is detected, or information of a distance to the detection target), that is, using, for example processing of determining whether the detection target is the obstacle, or processing of determining whether to cause the combine harvester 1 to execute a predetermined countermeasure processing (for example, the notification processing, the deceleration processing, the stop processing, or work interruption). In contrast, "disabling the detection function" means not to use the detection result of detecting the detection target by the detection unit 53. Specifically, in disabling the detection function, the setting processing unit 112 sets, for example, the detection result of the detection unit 53 to be not used by each processing unit (the travel processing unit 111, the detection processing unit 113, and the like). Alternatively, in disabling the detection function, the setting processing unit 112 may stop, for example, the operation of the detection unit 53 (for example, the operation of outputting a detection signal such as a laser or an ultrasonic wave), may set the power of the detection unit 53 to the OFF state, or may not cause the detection unit 53 to output the detection result of the detection target detected by the detection unit 53 to the control device 11.

In the present embodiment, for example, the detection unit 53 transmits the detection result to the control device 11 at a predetermined cycle. The control device 11 registers the detection result in detection information D1 (see FIG. 7). The detection information D1 registers data transmitted from each of the detection units 53 (the front detection unit 53F, the rear detection unit 53B, the left side detection unit 53L, and the right side detection unit 53R) at a predetermined cycle (time interval). For example, upon acquisition of the information indicating that the detection target has been detected from the detection unit 53, the control device 11 registers predetermined identification information (flag "1"). In a case where no information indicating detection of the detection target from the detection unit 53 or indicating no detection of the detection target from the detection unit 53 is acquired, the control device 11 registers predetermined identification information ("0"). The control device 11 registers the identification information ("1", "0") in the detection information D1 from the start to the end of the automatic traveling of the combine harvester 1.

The detection processing unit 113 executes predetermined processing based on the detection result of the detection unit 53. Specifically, when the detection unit 53 detects a detection target in a case where the detection function is set to be enabled, the detection processing unit 113 determines that the detection target is an obstacle, and performs a countermeasure processing (notification processing, deceleration processing, stop processing, work interruption, or the like) for the obstacle. Based on the detection information D1 (see FIG. 7), the detection processing unit 113 identifies the time and location (the detection unit that has detected the detection target among the front detection unit 53F, the rear detection unit 53B, the left side detection unit 53L, and the right side detection unit 53R, and the position coordinates of the detection target with respect to the field F) at which the detection target has been detected.

For example, when the detection unit 53 detects the detection target in the notification area in a state in which the detection function is set to be enabled, the detection processing unit 113 notifies an alarm externally. When the detection unit 53 detects the detection target in the deceleration area in a state in which the detection function is set to be enabled, the detection processing unit 113 decelerates the combine harvester 1. When the detection unit 53 detects the detection target in the stop area in a state in which the detection function is set to be enabled, the detection processing unit 113 stops the combine harvester 1. The detection processing unit 113 may execute different countermeasure processing according to the detection unit 53 (the front detection unit 53F, the rear detection unit 53B, the left side detection unit 53L, or the right side detection unit 53R) that has detected the obstacle.

In contrast, when the detection unit 53 detects the detection target in a state in which the detection function is set to be disabled, the detection processing unit 113 does not determine that the detection target is the obstacle and does not perform the countermeasure processing. Specifically, even when the identification information (flag "1") indicating the detection of detection target is registered in the detection information D1, the detection processing unit 113 ignores this and omits the countermeasure processing. In this case, the travel processing unit 111 keeps the automatic travel of the combine harvester 1.

Thus, the detection processing unit 113 executes processing on the detection target based on the setting state ("enabled" or "disabled") of the detection function and the detection result of the detection unit 53.

Figure 8:
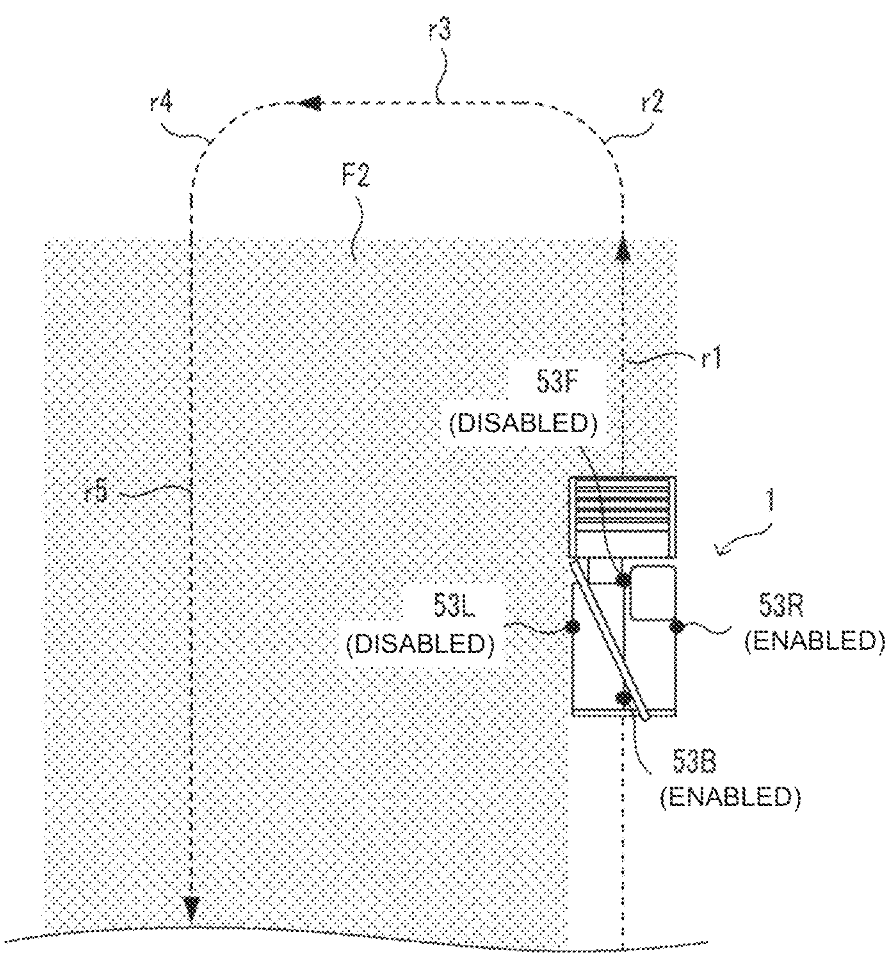
FIG. 8 illustrates an example of a traveling method of the combine harvester according to the embodiment of the present invention.

A specific example of a method of setting the detection function is described. For example, when the target route R includes the work route for performing a predetermined work (for example, the reaping work) on the work object (for example, the grain culms), the setting processing unit 112 sets the detection function to be disabled when the combine harvester 1 travels on an unworked work route on which the work has not been performed, while setting the detection function to be enabled when the combine harvester 1 travels on a work-completed work route on which the work has been performed. FIG. 8 illustrates an example of the reaping operation by the combine harvester 1. As illustrated in FIG. 8, the combine harvester 1 travels straight in the inner peripheral area F2 while performing the reaping work on the unworked work route r1, lifts the reaping unit 3 and stops the reaping work when leaving the inner peripheral area F2. Then, the combine harvester 1 travels through the turning route r2, the straight traveling route r3, and the turning route r4, and enters the inner peripheral area F2 where it restarts the reaping work by lowering the reaping unit 3 and travels straight on the work route r5.

On the travel routes described above, as illustrated in FIG. 8, when the combine harvester 1 travels on the unworked work route r1 in a state in which the work objects (grain culms) are present on the front side and the left side of the machine body, and the grain culms are not present on the rear side and the right side of the machine body, the setting processing unit 112 sets the detection function corresponding to the front detection unit 53F and the left side detection unit 53L to be disabled, while setting the detection function corresponding to the rear detection unit 53B and the right side detection unit 53R to be enabled.

Accordingly, for example, when the front detection unit 53F detects the detection target, the detection processing unit 113 does not execute the countermeasure processing (the notification processing, the deceleration processing, the stop processing, the work interruption, or the like) for the detection target, allowing the travel processing unit 111 to keep the automatic travel and the reaping work. This prevents determining the grain culms to be the obstacle and stopping the automatic travel or the like when, for example, the front detection unit 53F detects the grain culms. On the other hand, for example, when the right side detection unit 53R detects the detection target, the detection processing unit 113 determines the detection target to be the obstacle and executes the predetermined countermeasure processing (the notification processing, the deceleration processing, the stop processing, the reaping operation interruption, or the like). This allows appropriately detecting a person, when the person enters, for example, the work-completed area (reaped area) and approaches the combine harvester 1.

Figure 9:
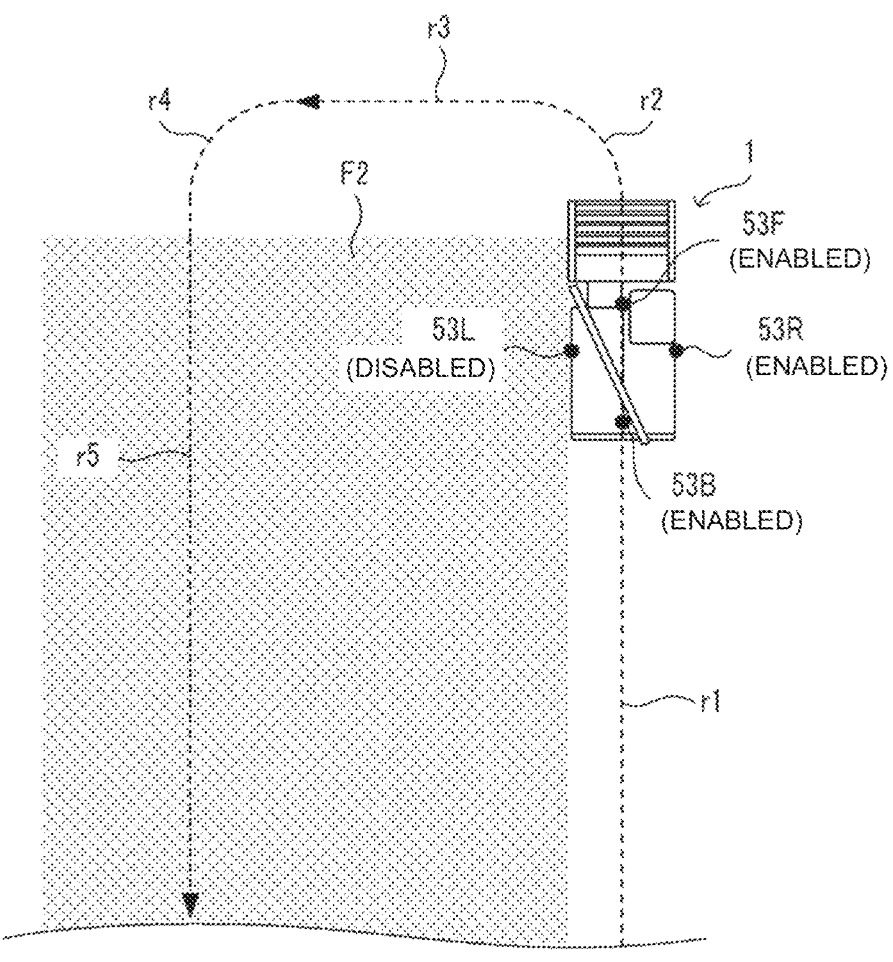
FIG. 9 illustrates an example of the traveling method of the combine harvester according to the embodiment of the present invention.

As illustrated in FIG. 9, when the combine harvester 1 finishes the reaping work on the work route r1 and no grain culms are present in front of the machine body, the setting processing unit 112 switches the detection function corresponding to the front detection unit 53F from the disabled state to the enabled state. This allows appropriate detection of the obstacle that is present in front of the combine harvester 1 immediately after it exits the inner peripheral area F2. When the target route R on which the combine harvester 1 is traveling is switched from the work route to the non-work route, the setting processing unit 112 may switch the detection function from the disabled state to the enabled state before the start position of the non-work route (in FIG. 9, the end of the work route r1). This makes it possible to appropriately detect the obstacle is present near the boundary of the inner peripheral area F2.

Figure 10:
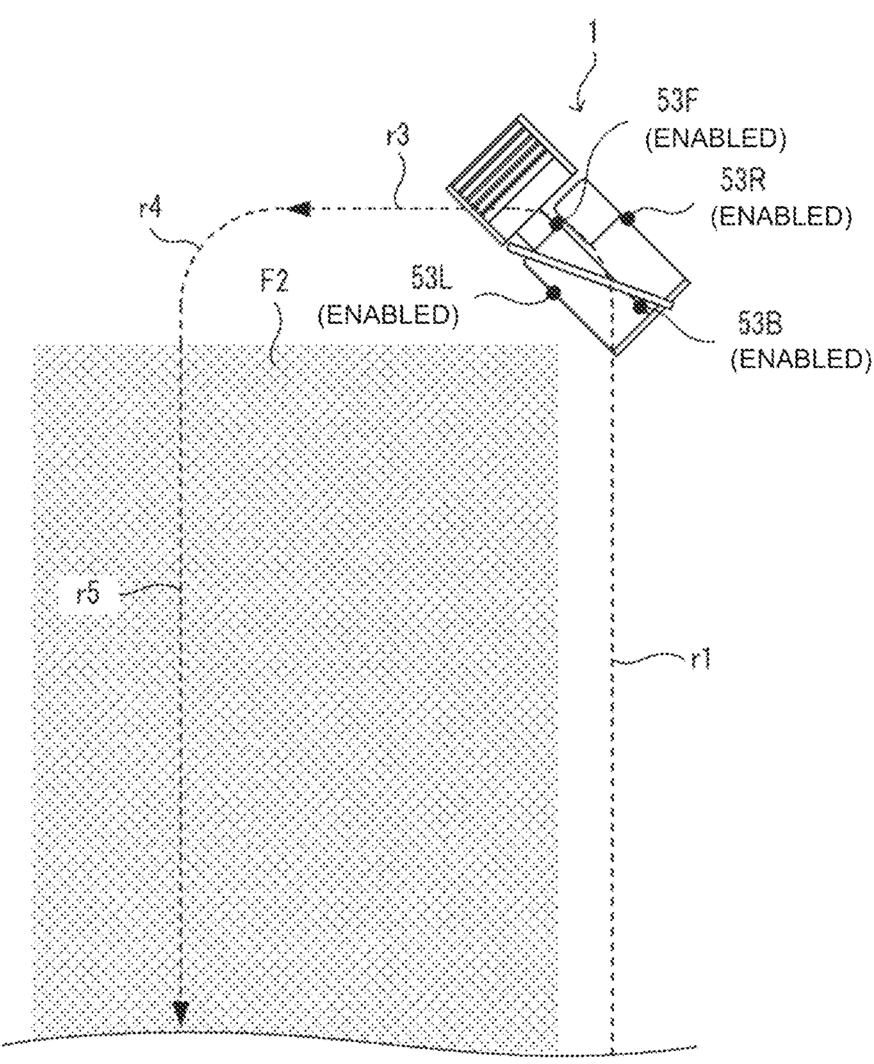
FIG. 10 illustrates an example of the traveling method of the combine harvester according to the embodiment of the present invention.

As illustrated in FIG. 10, when the combine harvester 1 exits the inner peripheral area F2 and travels on the turning route r2, the grain culms are no longer present on the left side of the machine body, and therefore the setting processing unit 112 switches the detection function corresponding to the left side detection unit 53L from the disabled state to the enabled state. This allows appropriate detection of the obstacle that is present on the left side immediately after the combine harvester 1 exits from the inner peripheral area F2. The combine harvester 1 travels in the reaped area (the work-completed area) of the inner peripheral area F2 (the outer peripheral area F1) in a state in which all the detection units 53 (the front detection unit 53F, the rear detection unit 53B, the left side detection unit 53L, and the right side detection unit 53R) are set to be enabled.

Figure 11:
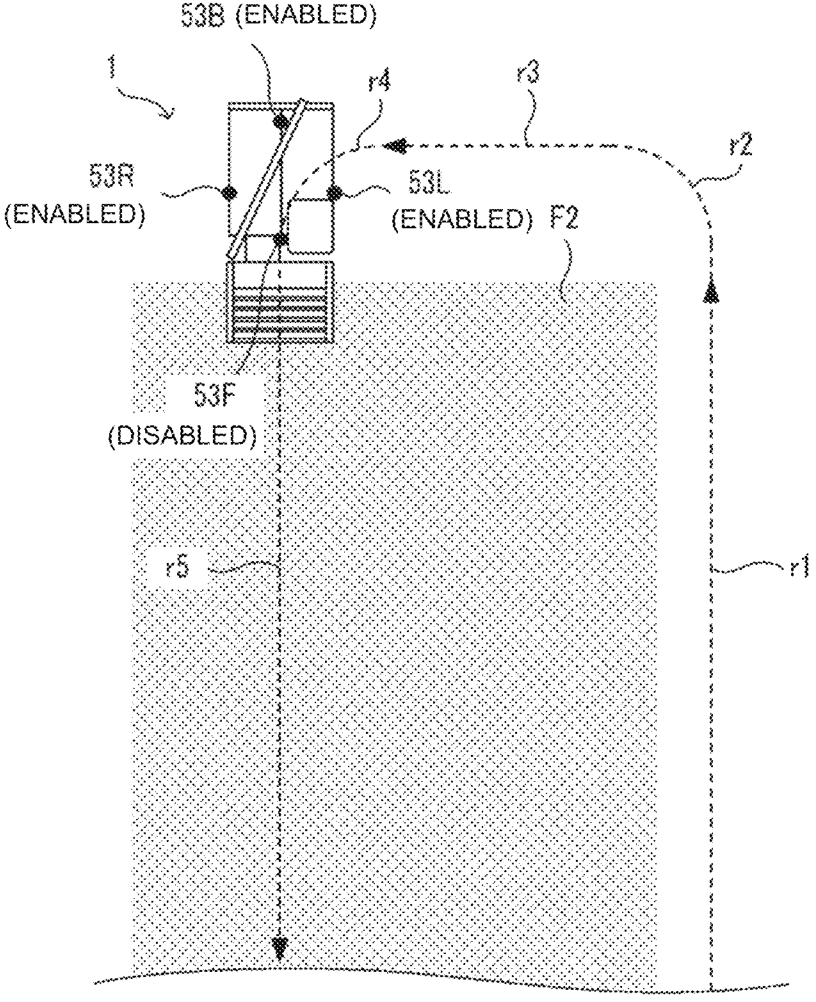
FIG. 11 illustrates an example of the traveling method of the combine harvester according to the embodiment of the present invention.

As illustrated in FIG. 11, when the combine harvester 1 enters the inner peripheral area F2 from the outer peripheral area F1 and the grain culms are present in front of the machine body, the setting processing unit 112 switches the detection function corresponding to the front detection unit 53F from the enabled state to the disabled state. This prevents unintended execution of the countermeasure processing (the notification processing, the deceleration processing, the stopping process, the reaping work interruption, or the like) when the combine harvester 1 travels and performs the reaping work on the work route r5 and determines the grain culms that are present in front as the obstacle.

Figure 12:
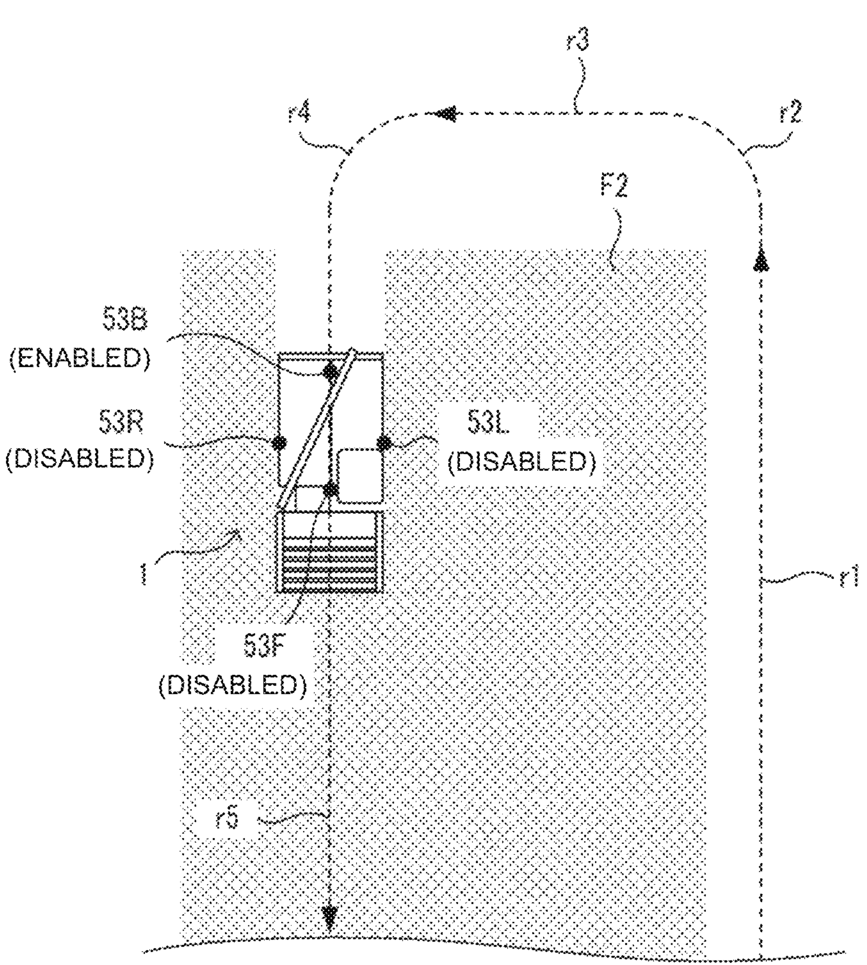
FIG. 12 illustrates an example of the traveling method of the combine harvester according to the embodiment of the present invention.

As illustrated in FIG. 12, when the combine harvester 1 travels straight on the work route r5 in the inner peripheral area F2 and the grain culms are further present on the left side and the right side of the machine body, the setting processing unit 112 switches the detection function corresponding to the left side detection unit 53L and the right side detection unit 53R from the enabled state to the disabled state. This prevents unintended execution of the countermeasure processing (the notification processing, the deceleration processing, the stop processing, the reaping work interruption, or the like) when the combine harvester 1 travels on the work route r5 and performs the reaping work and determines the grain culms that are present on the left side and the right side as the obstacles.

As described above, the control device 11 sets the detection function for the detection target to be enabled or disabled according to the travel route. The control device 11 also determines whether to cause the combine harvester 1 to execute the predetermined countermeasure processing according to the setting state of the detection function.

The combine harvester 1 according to the present embodiment includes the detection unit 53 having a detection range in front of the combine harvester 1 and the detection unit 53 having a detection range on the side of the combine harvester 1, and the detection function is set to be enabled or disabled for each detection unit 53 based on the target route R. The control device 11 sets the detection function corresponding to the detection unit 53 having a detection range covering the unworked work route (unreaped area) adjacent to the work route on which the combine harvester 1 travels to be disabled, while setting the detection function corresponding to the detection unit 53 having a detection range covering the work-completed work route (reaped area) adjacent to the work route on which the combine harvester 1 travels to be disabled.

In the combine harvester 1 according to the present embodiment, the control device 11 is configured to cause the combine harvester 1 to execute the predetermined countermeasure processing on the detection target (obstacle) when the detection target is detected in a state in which the detection function is set to be enabled, and not cause the combine harvester 1 to execute the countermeasure processing when the detection target is detected in a state in which the detection function is set to be disabled. For example, when the detection unit 53 detects the detection target in a state in which the detection function is set to be enabled, the control device 11 determines the detection target as the obstacle and executes the countermeasure processing (the notification processing, the deceleration processing, the stop processing, the work interruption, or the like) for the obstacle. When the detection unit 53 detects, for example, the detection target in a state in which the detection function is set to be disabled, the control device 11 does not determine the detection target as the obstacle and omits the countermeasure processing.

Alternatively, for the detection function corresponding to a certain detection unit 53, when the combine harvester 1 travels on the unworked work route, the control device 11 (the setting processing unit 112) may set the detection function corresponding to a first predetermined range including the work object to be disabled, and set the detection function corresponding to a second predetermined range not including the work object to be enabled. For example, when the combine harvester 1 travels on the work route r1 (see FIG. 8), the setting processing unit 112 sets the detection function to be disabled for a lower region including the grain culms in the detection area of the front detection unit 53F, and sets the detection function to be enabled for an upper region above the grain culms in the detection area. For example, the setting processing unit 112 masks the lower region to omit the detection processing of the lower region. This prevents execution of the countermeasure processing of, for example, the front lower side even when the grain culms are detected there, while allowing execution of the countermeasure processing in the upper side when a person or the like is detected there. In this way, the setting processing unit 112 may be able to set the detection function of each detection unit 53 to be enabled or disabled for each region within the detection area.

Travel Processing

Figure 13:
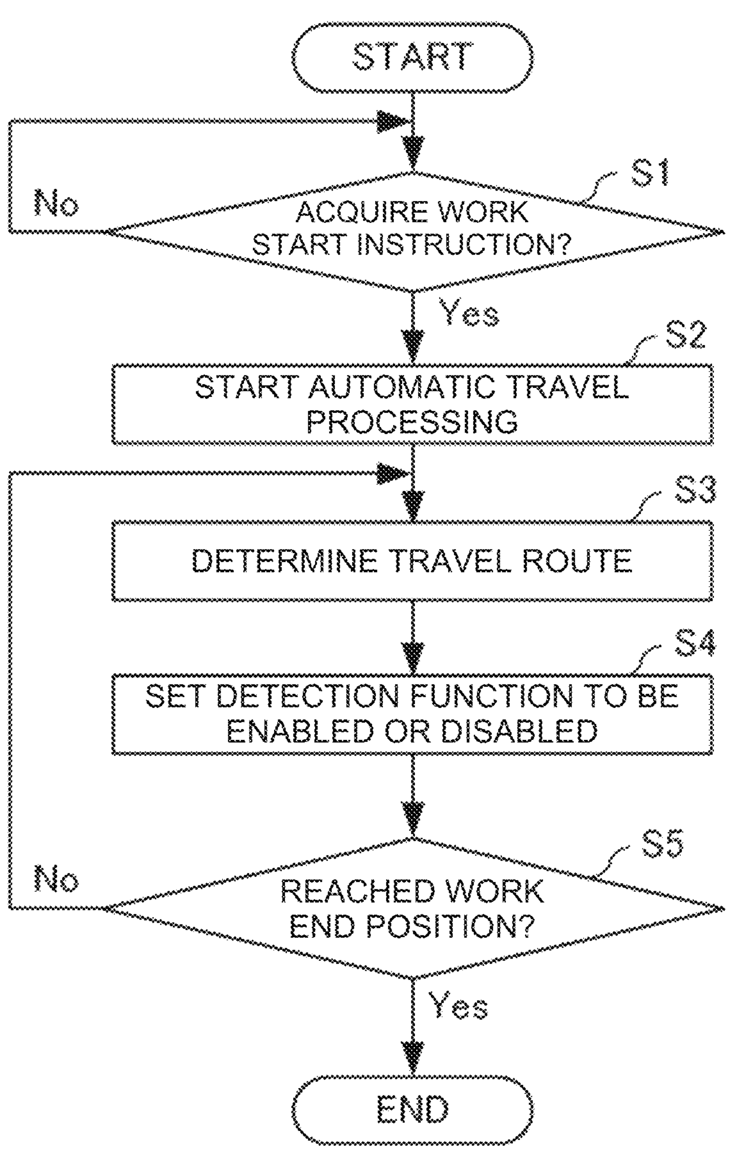
FIG. 13 is a flowchart illustrating an example of a procedure of traveling processing executed by a traveling system according to the embodiment of the present invention.

An example of the travel processing executed by the traveling system 10 is described with reference to FIG. 13.

The present invention can be considered as an invention of a traveling method for executing one or more steps included in the travel processing. One or more steps included in the travel processing described herein may be appropriately omitted. The steps of the travel processing may be executed in a different order to the extent that they produce similar effects and advantages. Although a case where the control device 11 of the combine harvester 1 executes the travel processing steps is described herein as an example, a traveling method in which one or more processors execute the travel processing steps in a distributed manner can be considered alternatively. The traveling method corresponding to the travel processing is an example of the detection method of the present invention.

In step S1, the control device 11 determines whether a work start instruction is acquired. Once the work start instruction is acquired from the operation terminal 30 or the operation device (the operation lever or the like) of the combine harvester 1 (S1: Yes), the control device 11 shifts the process to step S2. The control device 11 waits until the work start instruction is acquired (S1: No).

In step S2, the control device 11 starts the automatic travel processing. Specifically, the control device 11 causes the combine harvester 1 to automatically travel along the target route R included in the setting information acquired from the operation terminal 30. For example, the control device 11 causes the combine harvester 1 to perform the work (the reaping work) in the field F (see FIG. 4) while traveling it automatically along the target route R. The control device 11 may be able to accept the operation of the main shift lever by the operator who is riding on the combine harvester 1. In this case, the control device 11 changes the vehicle speed of the automatically traveling combine harvester 1 according to the operation of the operator.

In step S3, the control device 11 determines the travel route. For example, the control device 11 determines whether the route on which the combine harvester 1 travels is the work route in the unworked area (unreaped area), the work route in the work-completed area (reaped area), or the transfer route in a non-work area. The travel route includes a travel route (work route) in which the work is performed and a travel route (transfer route) in which the work is not performed. In addition, the control device 11 determines whether the left route (area) and the right route (area) adjacent to the route on which the combine harvester 1 travels are the work route of the unworked area (unreaped area), the work route of the work-completed area (reaped area), or the work route of the non-work area. The control device 11 also identifies the position of the combine harvester 1 on the route on which the combine harvester 1 is traveling.

Subsequently, in step S4, the control device 11 sets the detection function to be enabled or disabled. Specifically, the control device 11 sets the detection function corresponding to each of the detection units 53 (the front detection unit 53F, the rear detection unit 53B, the left side detection unit 53L, and the right side detection unit 53R) to be enabled or disabled based on the travel route determined in step S3.

For example, when the combine harvester 1 travels on the unworked work route r1 (see FIG. 8), the control device 11 sets the detection function corresponding to the front detection unit 53F to be disabled. For example, when the combine harvester 1 travels on the unworked work route r1 and the travel route adjacent to the left side of the work route r1 is the work route in the unworked area (unreaped area), the control device 11 sets the detection function corresponding to the left side detection unit 53L to be disabled.

For example, when the combine harvester 1 travels on the unworked work route r1 and the travel route adjacent to the right side of the work route r1 is the work route in the work-completed area (reaped area) or the transfer route of the non-work area, the control device 11 sets the detection function corresponding to the right side detection unit 53R to be enabled. For example, when the rear side of the combine harvester 1 is the work-completed area (reaped area) or the non-work area, the control device 11 sets the detection function corresponding to the rear detection unit 53B to be enabled.

In this way, the control device 11 sets the detection function to be enabled or disabled using the information on the travel route. The control device 11 switches the detection function from the enabled state to the disabled state or from the disabled state to the enabled state using the information on the travel route (see FIGS. 8 to 12).

The control device 11 executes the travel processing according to the setting state of the detection function. Specifically, when the detection unit 53 in which the detection function is set to be enabled detects the detection target, the control device 11 determines the detection target to be the obstacle and executes the countermeasure processing (the notification processing, the deceleration processing, the stop processing, the work interruption, or the like) for the obstacle. On the other hand, when the detection unit 53 with the detection function set to be disabled detects the detection target, the control device 11 does not execute the countermeasure processing.

For example, in the example illustrated in FIG. 8, when the right side detection unit 53R or the rear detection unit 53B with its function set to be enabled detects the detection target, the control device 11 determines the detection target to be the obstacle and executes the countermeasure processing (the notification processing, the deceleration processing, the stop processing, the work interruption, or the like) with respect to the obstacle. On the other hand, when the front detection unit 53F or the left side detection unit 53L with its detection function set to be disabled detects the detection target, the control device 11 does not determine the detection target as the obstacle, omits the countermeasure processing, and continues the automatic traveling.

In step S5, the control device 11 determines whether the combine harvester 1 has reached the end position G (see FIG. 5). When it is determined that the combine harvester 1 has reached the end position G (S5: Yes), the control device 11 ends the travel processing. When it is not determined that the combine harvester 1 has reached the end position G (S5: No), the control device 11 shifts the processing to step S3. The control device 11 repeatedly executes the above-described processing until the vehicle reaches the end position G (S5: No).

In this way, the control device 11 repeatedly executes the above-described processing from the start position S to the end position G to cause the combine harvester 1 to automatically travel along the target route R, while setting the detection function to be enabled or disabled in accordance with the travel route.

As described above, the combine harvester 1 according to the present embodiment is configured to detect the detection target around the combine harvester 1 by the detection units 53 provided in the combine harvester 1 that automatically travels along the target route R. The combine harvester 1 sets the detection function for the detection target to be enabled or disabled based on the target route R. Specifically, the target route R includes the work route for performing the predetermined work (for example, the reaping work) on the work object (for example, the grain culms). The combine harvester 1 sets the detection function to be disabled when traveling on the unworked work route, and sets the detection function to be enabled when traveling on the work-completed work route.

The above configuration prevents, for example, stopping the combine harvester 1 when the detection unit 53 detects the grain culms while the combine harvester 1 is traveling on the unworked work route (during the reaping work) and determines the grain culms to be the obstacle. For example, when the detection unit 53 detects the detection target in the work-completed work route and determines it to be the obstacle, the predetermined countermeasure processing (the notification processing, the deceleration processing, the stop processing, the work interruption, or the like) is executed. This allows appropriate detection of, for example, a person when the person enters the work-completed area (reaped region) and approaches the combine harvester 1. This configuration that sets the detection function to be enabled or disabled according to the travel route allows appropriate detection of the detection target as the obstacle.

Other Embodiments

The present invention is not limited to the embodiment described above. Other embodiments of the present invention are described below.

Figure 14:
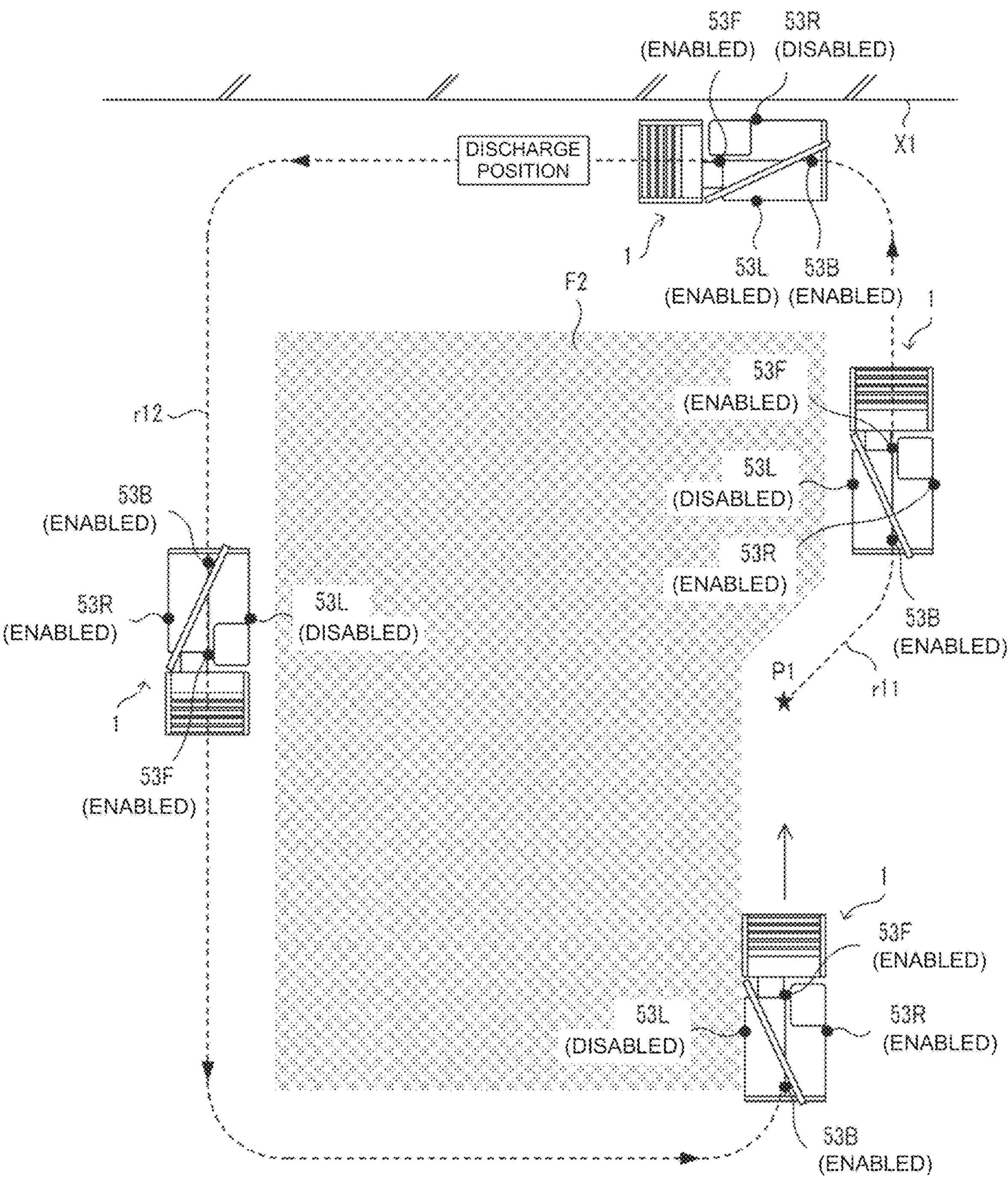
FIG. 14 illustrates an example of a traveling method of a combine harvester according to another embodiment of the present invention.
Figure 15:
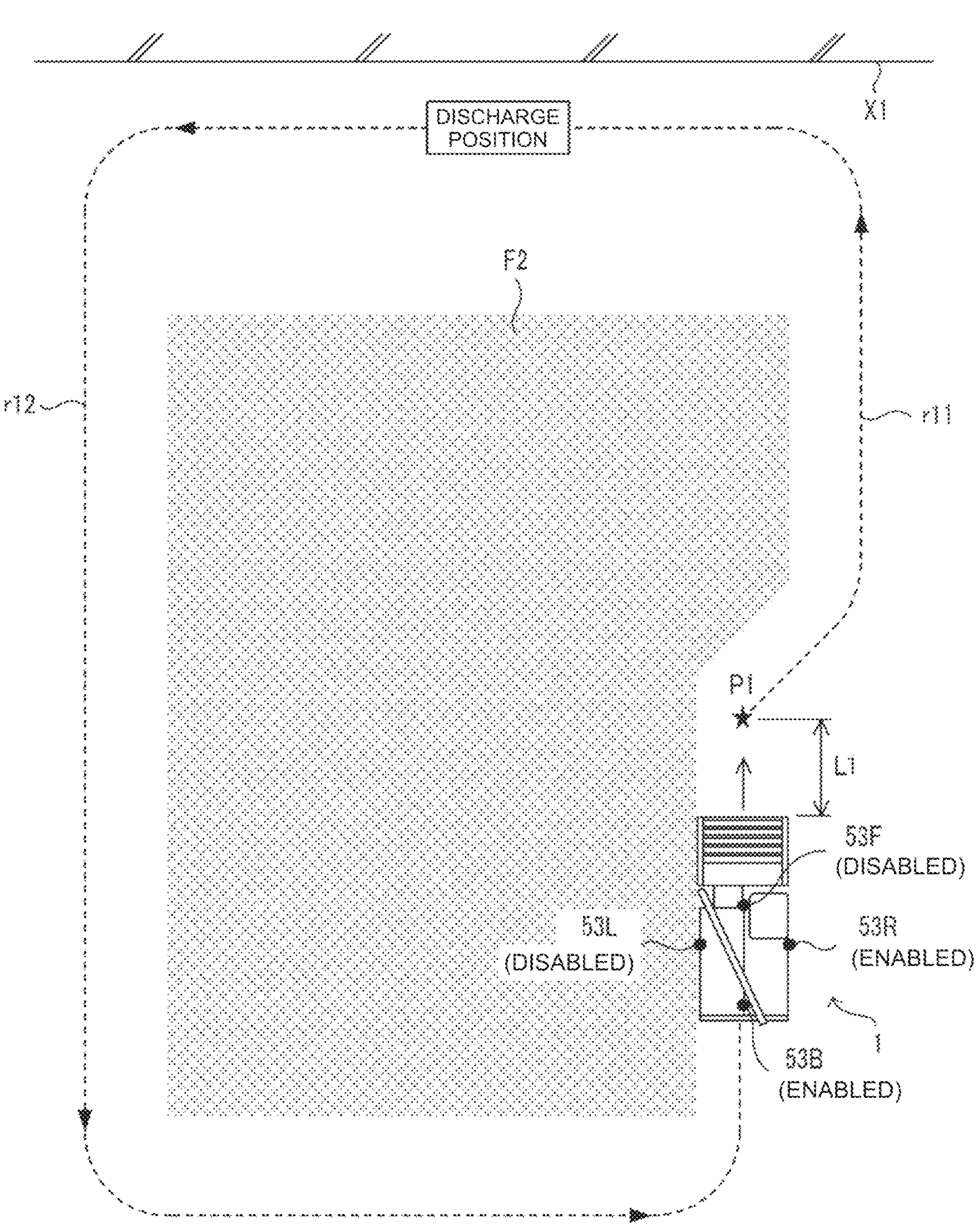
FIG. 15 illustrates an example of a traveling method of a combine harvester according to another embodiment of the present invention.

The combine harvester 1 may perform an intermediate work at a predetermined position in the middle of a predetermined work (for example, the reaping operation). For example, the intermediate work includes a discharging work in which the combine harvester 1 is moved to the discharge position during the reaping work to discharge the grains accumulated in the reservoir tank 27 to the transport vehicle, the refueling work in which the combine harvester 1 is moved to the refuel position during the reaping work for fueling, and the like. FIGS. 14 and 15 illustrate an example of the discharge operation.

For example, when the accumulated amount of the reservoir tank 27 reaches a predetermined amount (upper limit value) during the reaping operation, the travel processing unit 111 lifts the reaping unit 3 to stop the reaping operation, and causes the combine harvester 1 to travel on the transfer route r11 from the current position (a work interruption position P1) to the discharge position. In addition, the setting processing unit 112 sets the detection function corresponding to each detection unit 53 when the combine harvester 1 travels on the transfer route r11. For example, when the combine harvester 1 travels in the vicinity of the inner peripheral area F2 in the transfer route r11, the setting processing unit 112 sets the detection function corresponding to the left side detection unit 53L to be disabled, and sets the detection function corresponding to the front detection unit 53F, the rear detection unit 53B, and the right side detection unit 53R to be enabled.

In many cases, the discharging work, the refueling work, and the like are performed near the outer periphery of the field F. For example, the operator registers the discharge position and the refuel position at predetermined positions near the outer periphery of the field F in advance. Here, when the obstacle (for example, a ridge X1 (see FIG. 14)) having a predetermined height from the ground is present in the vicinity of the outer periphery, and the combine harvester 1 approaches the vicinity of the outer periphery while moving to the discharge position along the transfer route r11, the ridge X1 is detected, causing travel limiting processing such as deceleration or stopping to be executed.

Therefore, when the combine harvester 1 travels in the vicinity of the outer periphery of the field F, the setting processing unit 112 switches the detection function corresponding to the detection unit 53 on the outer peripheral side (the right side detection unit 53R in the example illustrated in FIG. 14) from the enabled state to the disabled state. This prevents the ridge X1 from being determined as the obstacle unnecessarily and restricting travel. Thus, by setting the detection function to be disabled so as to prevent fixed objects which are recognized in advance and do not affect driving safety from being determined as the obstacles, the work efficiency can be improved.

When the combine harvester 1 arrives at the discharge position and finishes the discharge operation, the travel processing unit 111 causes the combine harvester 1 to travel along a return route r12 from the discharge position to the work interruption position P1. When the combine harvester 1 travels on the return route r12, the setting processing unit 112 sets the detection function to be enabled or disabled according to the traveling route.

When the combine harvester 1 enters the inner peripheral area F2, returns to the work-completed work route, and approaches the work interruption position P1, the setting processing unit 112 switches the detection function corresponding to the front detection unit 53F from the enabled state to the disabled state at a position a predetermined distance L1 before the work interruption position P1 (see FIG. 15). The travel processing unit 111 also lowers the reaping unit 3 to restart the reaping work at the position a predetermined distance L1 before the work interruption position P1.

As described above, when the target route R on which the combine harvester 1 is traveling is switched from the work-completed work route to the unworked work route, the control device 11 switches the detection function from the enabled state to the disabled state at the position a predetermined distance before the start position of the unworked work route.

According to the above-described configuration, even when the combine harvester 1 travels along the transfer route to the predetermined position in order to interrupt the reaping operation and perform the discharging work or the refueling work, the detection function can be set to be enabled or disabled according to the transfer route. This allows the detection of the detection target appropriately as the obstacle.

In another embodiment of the present invention, when the combine harvester 1 travels on the unworked work route and an adjacent work route next to the unworked work route is an unworked work route, and when the detection unit 53 having the detection range including the adjacent work route does not detect the work object (grain culms), then the control device 11 may determine that the grain culms have fallen down and cause the combine harvester 1 to execute predetermined countermeasure processing. For example, in the example illustrated in FIG. 8, the detection function corresponding to the left side detection unit 53L is set to be disabled, but the left side detection unit 53L detects the grain culms and transmits the detection information to the control device 11. In this case, for example, when the detection information indicating that the left side detection unit 53L does not detect the grain culms is transmitted to the control device 11, the control device 11 determines that the grain culms are not present on the left side of the combine harvester 1. Thus, the grain culms cannot appropriately be recognized because the grain culms have fallen down and deviated from the detection range despite the grain culms are originally present. Therefore, when the control device 11 acquires the detection information indicating that the grain culms are not detected although the combine harvester 1 travels on the work route of the unworked area (unreaped area), the control device 11 determines that the grain culms are in the fell down state by, for example, stamping down. In this case, the control device 11 executes the countermeasure processing corresponding to the lodged state. For example, the control device 11 switches the vehicle speed of the combine harvester 1 to a low speed or lowers the height of the reaping unit 3 when the combine harvester 1 is made to travel in the fell down area.

In another embodiment, the control device 11 may determine that the grain culms on the left side are in the fell down state when the front detection unit 53F composed of the lidar sensor detects the grain culms, but the left side detection unit 53L composed of the sonar sensor does not detect the grain culms. That is, when the combine harvester 1 travels on the unworked work route and the left side detection unit 53L or the right side detection unit 53R does not detect the work object (the grain culms) although the front detection unit 53F has detected the work object (for example, the grain culms), the control device 11 determines that the work object is fallen down.

In another embodiment of the present invention, the control device 11 may set the detection function corresponding to each detection unit 53 to be enabled or disabled according to the setting operation by the operator. For example, the operator may be able to set the detection function to be enabled or disabled for each of the front detection unit 53F, the rear detection unit 53B, the left side detection unit 53L, and the right side detection unit 53R on the operation screen of the operation terminal 30.

The work vehicle of the present invention may be the work vehicle that automatically travels (is automatically steered) on the work route (for example, the straight route) and manually travels (is manually steered) on the turning route, or may be the work vehicle that manually travels (is manually steered) on the work route and automatically travels (is automatically steered) on the turning route.

APPENDICES

Hereinafter, a summary of the invention extracted from the embodiments is described. Configurations and processing functions described in the appendices below may be selected, omitted, or combined as appropriate.

Appendix 1

A detection method for detecting a detection target around a work vehicle that automatically travels along a target route using a detection unit provided in the work vehicle, including executing setting of a detection function for the detection target to be enabled or disabled based on the target route.

Appendix 2

The detection method according to appendix 1, in which
the target route includes a work route for performing a predetermined work on a work object,
the detection function is set to be disabled when the work vehicle travels on an unworked work route, and
the detection function is set to be enabled when the work vehicle travels on a work-completed work route.

Appendix 3

The detection method according to appendix 2, in which
when the target route on which the work vehicle is traveling is switched from the work-completed work route to the unworked work route, the detection function is switched from an enabled state to a disabled state at a position a predetermined distance before a start position of the unworked work route.

Appendix 4

The detection method according to any one of appendices 1 to 3, in which
the target route includes the work route on which a predetermined work is performed for the work object,
the work vehicle includes the detection unit having a detection range for detecting the front of the work vehicle, and the detection unit having a detection range for detecting the side of the work route, and
the detection function is set to be enabled or disabled for each detection unit based on the target route.

Appendix 5

The detection method according to appendix 4, in which
the detection function corresponding to the detection unit having the detection range covering the unworked work route adjacent to the work route on which the work vehicle travels is set to be disabled, and
the detection function corresponding to the detection unit having the detection range covering the work-completed work route adjacent to the work route on which the work vehicle travels is set to be enabled.

Appendix 6

The detection method according to appendix 4 or 5, in which
for the detection function corresponding to one detection unit, when the work vehicle travels on the unworked work route, the detection function corresponding to a first predetermined range including the work object is set to be disabled, and the detection function corresponding to a second predetermined range including no work object is set to be enabled.

Appendix 7

The detection method according to any one of appendices 4 to 6, in which
when the work vehicle travels on the unworked work route and an adjacent work route adjacent to the work route is the unworked work route, and when the detection unit having the detection range covering the adjacent work route detects no work object, it is determined that the work object has fallen down, and the work vehicle is caused to execute predetermined processing.

Appendix 8

The detection method according to any one of appendices 1 to 7, in which
when the detection function is set to be enabled and the detection target is detected, the work vehicle is caused to execute the predetermined processing for the detection target, and
when the detection function is set to be disabled and the detection target is detected, the work vehicle is caused to execute no predetermined processing.

REFERENCE SIGNS LIST

1 Combine harvester (work vehicle)
2 Traveling unit
3 Reaping unit
4 Threshing unit
5 Sorting unit
6 Reservoir unit
7 Waste straw processing unit
8 Power unit
9 Steering unit
10 Traveling system
11 Control device
13 Divider
14 Positioning
51 Storage unit
52 Positioning unit
53 Detection unit
53F Front detection unit
53B Rear detection unit
53L Left side detection unit
53R Right side detection unit
54 Communication unit
111 Travel processing unit
112 Setting processing unit
113 Detection processing unit
F Field
R Target route

The invention claimed is:

1. A processor-implemented detection method for detecting one or more detection targets around a work vehicle that automatically travels along a target route using a detection unit provided in the work vehicle, comprising:
enabling, by a processor, a detection function capable of detecting the one or more detection targets based on a first value of a first parameter associated with the target route during travel of the work-vehicle, wherein the detection function is enabled when the first value is indicative of a work-completed work route where a predetermined work on a work object has been performed;
disabling by the processor, the detection function based on a second value of the first parameter associated with the target route during travel by the work-vehicle, wherein the detection function is disabled when the second value is indicative of an unworked work route;
initiating predetermined processing based on a current state of the detection function; and
switching the detection function from an enabled state to a disabled state when the work vehicle detects a change from the first value to the second value indicating a change from the work-completed work route to the unworked work route, wherein the detection function is switched from an enabled state to a disabled state when the work vehicle is a predetermined distance before a start position of the unworked work route.

2. The detection method according to claim 1, wherein the target route includes a current work route on which a predetermined work is performed for a work object, the detection unit comprises a plurality of detection sensors, including a front detection sensor for detecting the one or more detection targets in front of the work vehicle, and at least one side detection sensor for detecting the one or more detection targets on at least one corresponding side of the work route, and route; wherein, enabling the detection function comprises selectively enabling one or more of: the front detection sensor, or the at least one side detection sensor based on corresponding first values of one or more second parameters associated with the target route; and disabling the detection function comprises selectively disabling one or more of: the front detection sensor, or the at least one side detection sensor based on corresponding second values of one or more second parameters associated with the target route.

3. The detection method according to claim 2, wherein selectively disabling the detection function comprises selectively disabling the at least one side detection sensor, when the corresponding second values of the second parameter indicate presence of an unworked work route adjacent to the current work route on which the work vehicle travels, and selectively enabling the detection function comprises selectively enabling the at least one side detection sensor when the corresponding first values of the second parameter indicates presence of a work-completed work route adjacent to the current work route on which the work vehicle travels.

4. The detection method according to claim 2, wherein selectively disabling the detection function comprises selectively disabling at least one first detection sensor of the plurality of detection sensors, wherein the at least one disabled first detection sensor corresponds to a first predetermined range that includes the work object when the work vehicle travels on the unworked work route, and selectively enabling the detection function comprises selectively enabling at least one second detection sensor of the plurality of detection sensors, wherein the at least one enabled second detection sensor corresponds to a second predetermined range that does not include the work object.

5. The detection method according to claim 1, further comprising:

executing the predetermined processing for the detection target when the detection function is enabled and the detection target is detected.

6. A processor-implemented detection method for detecting one or more detection targets around a work vehicle that automatically travels along a target route using a detection unit provided in the work vehicle, wherein:

the target route includes a current work route on which a predetermined work is performed for a work object, the detection unit comprises a plurality of detection sensors, including a front detection sensor for detecting the one or more detection targets in front of the work vehicle, and at least one side detection sensor for detecting the one or more detection targets on at least one corresponding side of the work route, the detection method comprising:

enabling, by a processor, a detection function capable of detecting the one or more detection targets based on a first value of a first parameter associated with the target route during travel of the work-vehicle, wherein enabling the detection function comprises selectively enabling one or more of: the front detection sensor, or the at least one side detection sensor based on corresponding first values of one or more second parameters associated with the target route;

disabling by the processor, the detection function based on a second value of the first parameter associated with the target route during travel by the work-vehicle, wherein disabling the detection function comprises selectively disabling one or more of: the front detection sensor, or the at least one side detection sensor based on corresponding second values of one or more second parameters associated with the target route;

initiating predetermined processing based on a current state of the detection function; and executing the predetermined processing when the least one selectively enabled side detection sensor corresponding to an adjacent work route adjacent to the work route detects no work object and it is determined that the work object has fallen down.

7. A non-transitory computer-readable medium comprising instructions to configure a processor to perform a detection method that detects a detection target around a work vehicle using a detection unit provided in the work vehicle during automatic travel by the work vehicle along a target route, the detection method comprising:

enabling a detection function capable of detecting the detection target based on a first value of a first parameter associated with the target route, wherein the detection function is enabled when the first value is indicative of a work completed work route where a predetermined work on a work object has been performed;

disabling by the processor, the detection function based on a second value of the first parameter associated with the target route during travel by the work-vehicle, wherein the detection function is disabled when the second value is indicative of an unworked work route;

initiating predetermined processing based on a current state of the detection function; and switching the detection function from an enabled state to a disabled state when the work vehicle detects a change from the first value to the second value indicating a change from the work-completed work route to the unworked work route, wherein the detection function is switched from an enabled state to a disabled state when the work vehicle is a predetermined distance before a start position of the unworked work route.

8. The computer-readable medium of claim 7, wherein the computer-readable medium is comprised in a work vehicle, wherein the work vehicle further comprises the processor, the processor comprising:

a detection unit configured to perform:

the detection function, and the predetermined processing; and a setting processing unit configured to perform:
the enabling of the detection function,
the disabling of the detection function, and
the switching of the detection function from the enabled state to the disabled state.

* * * * *